United States Patent
Lehoux et al.

(10) Patent No.: US 9,254,449 B2
(45) Date of Patent: Feb. 9, 2016

(54) SOLID AND LIQUID SEPARATION PROCESS

(75) Inventors: Richard Romeo Lehoux, Windsor (CA); Christopher Bruce Bradt, LaSalle (CA)

(73) Assignee: GreenField Specialty Alcohols Inc., Toronto (CA)

(*) Notice: Subject to any disclaimer, the term of this patent is extended or adjusted under 35 U.S.C. 154(b) by 721 days.

(21) Appl. No.: 13/554,557

(22) Filed: Jul. 20, 2012

(65) Prior Publication Data

US 2013/0025798 A1    Jan. 31, 2013

Related U.S. Application Data

(60) Provisional application No. 61/512,708, filed on Jul. 28, 2011.

(51) Int. Cl.

| | |
|---|---|
| *B01D 1/18* | (2006.01) |
| *B01D 3/38* | (2006.01) |
| *C12C 11/11* | (2006.01) |
| *B01D 1/26* | (2006.01) |

(Continued)

(52) U.S. Cl.
CPC .. *B01D 1/18* (2013.01); *B01D 1/26* (2013.01); *B01D 3/38* (2013.01); *C12C 11/11* (2013.01); *C12F 3/10* (2013.01); *F26B 3/12* (2013.01); *F26B 2200/02* (2013.01)

(58) Field of Classification Search
CPC .............. B01D 1/18; B01D 1/26; B01D 3/38; C12C 11/11
USPC ............................ 159/4.4, 48.1; 426/493, 494
See application file for complete search history.

(56) References Cited

U.S. PATENT DOCUMENTS

| | | | |
|---|---|---|---|
| 3,052,546 A * | 9/1962 | Riddell et al. | ................. 426/15 |
| 3,489,654 A | 1/1970 | Geiringer | |
| 3,721,568 A | 3/1973 | Wilson | |

(Continued)

FOREIGN PATENT DOCUMENTS

| | | |
|---|---|---|
| CN | 101168746 A | 4/2008 |
| CN | 101974567 A | 2/2011 |

(Continued)

OTHER PUBLICATIONS

International Patent Application No. PCT/CA2012/050495, International Search Report dated Sep. 25, 2012.

(Continued)

*Primary Examiner* — Renee E Robinson
*Assistant Examiner* — Jonathan Miller
(74) *Attorney, Agent, or Firm* — Borden Ladner Gervais LLP

(57) ABSTRACT

A process for separation of solid and liquid components in a distillation whole stillage utilizing airless spray drying is disclosed, which is more efficient and economical than conventional processes. In the process, distillation whole stillage resulting from distillation of fermented biomass is first subjected to an evaporation step for separating the whole stillage into a condensate and a concentrate including water, dissolved solids and suspended solids. The concentrate is then subjected to airless steam spray drying for converting the concentrate into dried solids, steam and vapors. All steam and vapors resulting from the airless steam spray drying step are then redirected as energy source to a processing step upstream of the airless spray drying step. At least some of the steam generated in the airless spray drying step is airless steam.

14 Claims, 3 Drawing Sheets

(51) Int. Cl.
*C12F 3/10* (2006.01)
*F26B 3/12* (2006.01)

(56) References Cited

U.S. PATENT DOCUMENTS

| | | | |
|---|---|---|---|
| 3,925,904 A | | 12/1975 | Kelly |
| 4,328,074 A | * | 5/1982 | Standiford ............ 203/19 |
| 4,381,220 A | * | 4/1983 | Standiford ............ 202/154 |
| 4,662,990 A | * | 5/1987 | Bonanno ............ 159/20.1 |
| 4,702,798 A | * | 10/1987 | Bonanno ............ 159/47.1 |
| 5,209,821 A | | 5/1993 | Shaw et al. |
| 5,316,782 A | * | 5/1994 | Zimlich, III ............ 426/624 |
| 7,641,928 B2 | * | 1/2010 | Jump et al. ............ 426/479 |
| 8,034,586 B2 | * | 10/2011 | Broekaert et al. ............ 435/72 |
| 8,101,808 B2 | * | 1/2012 | Evanko et al. ............ 568/916 |
| 8,257,951 B2 | * | 9/2012 | Prevost et al. ............ 435/161 |
| 8,524,473 B2 | * | 9/2013 | Hammond et al. ............ 435/161 |
| 8,906,204 B2 | * | 12/2014 | Xu ............ 203/18 |
| 2009/0263540 A1 | | 10/2009 | Allen et al. |
| 2009/0269477 A1 | | 10/2009 | Tate et al. |
| 2010/0146807 A1 | | 6/2010 | Gibson |
| 2010/0178624 A1 | | 7/2010 | Srinivasachar |
| 2011/0086149 A1 | | 4/2011 | Bootsma |
| 2012/0115200 A1 | | 5/2012 | Dottori et al. |
| 2013/0206342 A1 | * | 8/2013 | Dahmes et al. ............ 159/4.01 |

FOREIGN PATENT DOCUMENTS

| | | |
|---|---|---|
| GB | 2054643 A | 2/1981 |
| WO | 2010005940 A1 | 1/2010 |

OTHER PUBLICATIONS

European Patent Application No. 12817499.2-1351 Extended European Search Report dated Feb. 19, 2015.

* cited by examiner

Figure 1: PRIOR ART

SOLID AND LIQUID SEPARATION PROCESS

CROSS REFERENCE TO RELATED APPLICATIONS

This application claims the benefit of priority of U.S. Provisional Patent Application No. 61/512,708 filed Jul. 28, 2011, which is incorporated herein by reference in its entirety.

FIELD OF THE INVENTION

The present invention relates generally to a process for separation of solid and liquid components in a lignocellulose ethanol process. More particularly, the present invention relates to a process for separation of solid and liquid components of lignocellulosic biomass solid residues utilizing an airless spray dryer.

BACKGROUND OF THE INVENTION

Efficient lingocellulose biomass conversion to ethanol results in a distillation whole stillage that has very fine residue particles (mostly lignin, protein and ash) that cannot be separated effectively or economically using typical separation equipment such as centrifuges due to the large volume of fluid in a typical plant. In known processes, the solid and liquid components are separated using a mechanical filter separator consisting of fine cloth presses squeezed together using hydraulic pressure created by electrical motors. The separated liquid portion from the filter press is then fed to an evaporator for further condensing and the solid portion to a conventional dryer or it is burnt as a wet energy material in a special boiler.

Whole stillage soluble solids left in the liquid portion are deleterious to recycling back into the lignocellulose biomass conversion process and must be removed and treated. Typical solid liquid separation technologies remove suspended solids only and allow the soluble solids to pass through the separation step. Treatment of lignocellulosic soluble solids (e.g. digestion) is not very effective in high yield enzymatic lingocellulose to ethanol conversion processes. Concentration of the soluble solids can be energy efficiently done with a multi effect evaporation train, but total water removal can not be achieved as the fluid becomes very vicious as the water is evaporated from the liquid. Thus, additional treatment such as an air dryer is required which consumes large amounts of energy and the additional treatment is complex due to the stickiness of the solids.

Equipment required to effectively perform solid liquid separation, such as a filter press, is expensive due to the large volume of biomass to process. Also, using a filter press is inefficient as it only removes about 50% of the liquid from the solids.

As such, the high moisture solids treated by filter press technology requires further drying in order for the solids to be used as a fuel in standard boiler combustion systems, otherwise the wet mixture can only be combusted using more complex fluidized bed combustion systems which are designed to handle higher amounts of water. The removal of liquid in this manner requires additional energy, usually in the form of heat energy derived from natural gas or coal, and electrical energy to run the hydraulic pumps that "squeeze" the solids in the filter press, which energy cannot be reused for other purposes effectively or economically, due to contamination of steam with air. When steam is contaminated with air, added energy is no longer fully reusable, since the steam then transfers heat to its surroundings at a lower temperature, making the transfer much less useful. As most of the work we to be done in an ethanol plant is to boil water, any condensing temperature below that of boiling water is not readily useful. This better understood from the below chart, which shows the impact of air in steam at various pressures.

| Resulting Temperature - Air and Steam Mixture | | | | | | | | | |
|---|---|---|---|---|---|---|---|---|---|
| Mixture Pressure | | 0% Air (Pure Steam) | | 5% Air | | 10% Air | | 15% Air | |
| (psig) | (bar) | (° F.) | (° C.) | (° F.) | (° C.) | (° F.) | (° C.) | (° F.) | (° C.) |
| 2 | 0.15 | 219 | 104 | 216 | 102 | 213 | 101 | 210 | 99 |
| 5 | 0.35 | 227 | 108 | 225 | 107 | 222 | 106 | 219 | 104 |
| 10 | 0.7 | 239 | 115 | 237 | 114 | 233 | 112 | 230 | 110 |
| 20 | 1.4 | 259 | 126 | 256 | 124 | 252 | 122 | 249 | 121 |

For example, when the mixture is dried for use in a standard combustion boiler and it is dried in a separate dryer, the steam used for drying cannot be recycled, since it contains too much air (normal condensing temperature is around 60 C as there is normally over 70% air), which means the drying costs are very high when using this standard drying technology.

Depending on the type of lignocellulosic feedstock, these drying and combustion systems may require thermal oxidizers to reduce odours emitted to the environment from volatile organic compounds within the mixture.

As such, the steps of evaporation and conventional drying require significant amounts of energy and post treatment and, consequently are expensive.

It is therefore desirable to provide a process for separation of solid and liquid components which requires less capital and is more energy efficient.

SUMMARY OF THE INVENTION

It is an object of the present disclosure to obviate or mitigate at least one disadvantage of previous solid/liquid separation processes. In particular, the applicant has realized that a dry high energy steam vapour atmosphere spray dryer, a so-called "airless spray dryer" used in conjunction with evaporation, preferably triple effect evaporation, can provide an improved process of solid and liquid separation for a whole stillage stream in a lignocellulose to ethanol process. Airless spray dryers are also known as vapor atmosphere spray dryers (see US 2010/0146807; "Gibson"). Gibson discloses a vapor atmosphere spray dryer with a closed loop circuit including a dryer and a filter system with piping for circulating a mass of superheated vapor between the dryer and the filter system. The advantages of using an airless spray dryer are (1) the possibility to reuse all of the steam generated during drying, since not contaminated with air, and (2) the complete recycling of the drying atmosphere in a closed loop, obviating any venting of gases to the environment and, thus, obviating any equipment for treating the vented gases prior to release to the atmosphere.

The inventors have developed an environmentally friendly process that separates both soluble and suspended solids from a liquid stream in the post distillation stillage stream (distillation whole stillage) that reduces capital and operating cost.

In one example, distillation whole stillage, having about 8% to 9% solids can be concentrated to a maximum of 20% to 25% solids in a forced circulation evaporator. The characteristics of this concentrated slurry are very suitable for pumping and atomizing in spray dryer technology. This is largely in part due to the very small particle size of the suspended solids and the temperature which makes the viscosity of the slurry manageable. These particles are typically less than 50 microns in size and the temperature of the slurry is above 85 C. The inventors surprisingly discovered that it is more economical to use evaporation+airless spray drying, even if the concentrated slurry only has 20-25% solids, compared to a filtered slurry in the prior art processes at 50% solids. Since the drying steam can be reused continually when an airless spray dryer is used, as in the system and method of the invention, the overall process is much more efficient than a prior art process in which the air contaminated steam from a conventional dryer cannot be reused because of its height air content. As a result, the process and system of the invention is more efficient and uses fewer pieces of equipment, resulting in better plant economics. The airless spray dryer only needs to be about 75% efficient to exceed the performance in terms of energy consumption of a conventional process using a filter. In addition, less equipment is needed to run the process of the invention, reducing capital and energy cost. Environmentally, the system and process of the invention is also superior in that no disposal and/or treatment of the dirty water stream from the filter press and the dirty air stream from the dryer is needed.

Utilizing airless spray drying technology, the concentrated slurry can be dried to about 95 to 99% solids in a vapour atmosphere using super heated steam as the energy source within the spray dryer. An energy source, such as natural gas, biomass, coal, or electricity, is indirectly used through heat exchangers to maintain the required super heat of the steam vapour within the spray dryer. The excess steam generated during the drying process, having a pressure approximately 8 psig but below 15 psig, can be used to supply heat to other process equipment, reducing the need for heat energy in the other process equipment. The majority of the heat energy invested into the process is retained in the process or efficiently used in related processing steps. Overall, a much higher degree of efficiency is achieved, since very little energy is exhausted into the atmosphere.

Sufficient excess steam generated during drying can supply all of the requirements for primary distillation, and evaporation of the whole stillage. For example, evaporation in the airless spray dryer to about 25% solids in the evaporator, generally generates an amount of excess steam which supplies all the energy needed to operate the evaporator and the ethanol distillation system. This efficient reuse of airless spray drying steam can reduce the overall energy demands of the lignocellulosic biofuel production process by more than 30% compared to conventional processes Thus, the combination of evaporation, preferably triple effect evaporation, with subsequent airless spray drying is advantageous over conventional solid/liquid separation, evaporation and conventional drying as it requires lower capital costs (filter presses at a cost of about $2M are obviated), lower energy usage (efficient reuse of all excess steam), and fewer emissions to the environment (closed system, no air or steam exhausted to the atmosphere).

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION OF THE PREFERRED EMBODIMENTS

Figure 1:
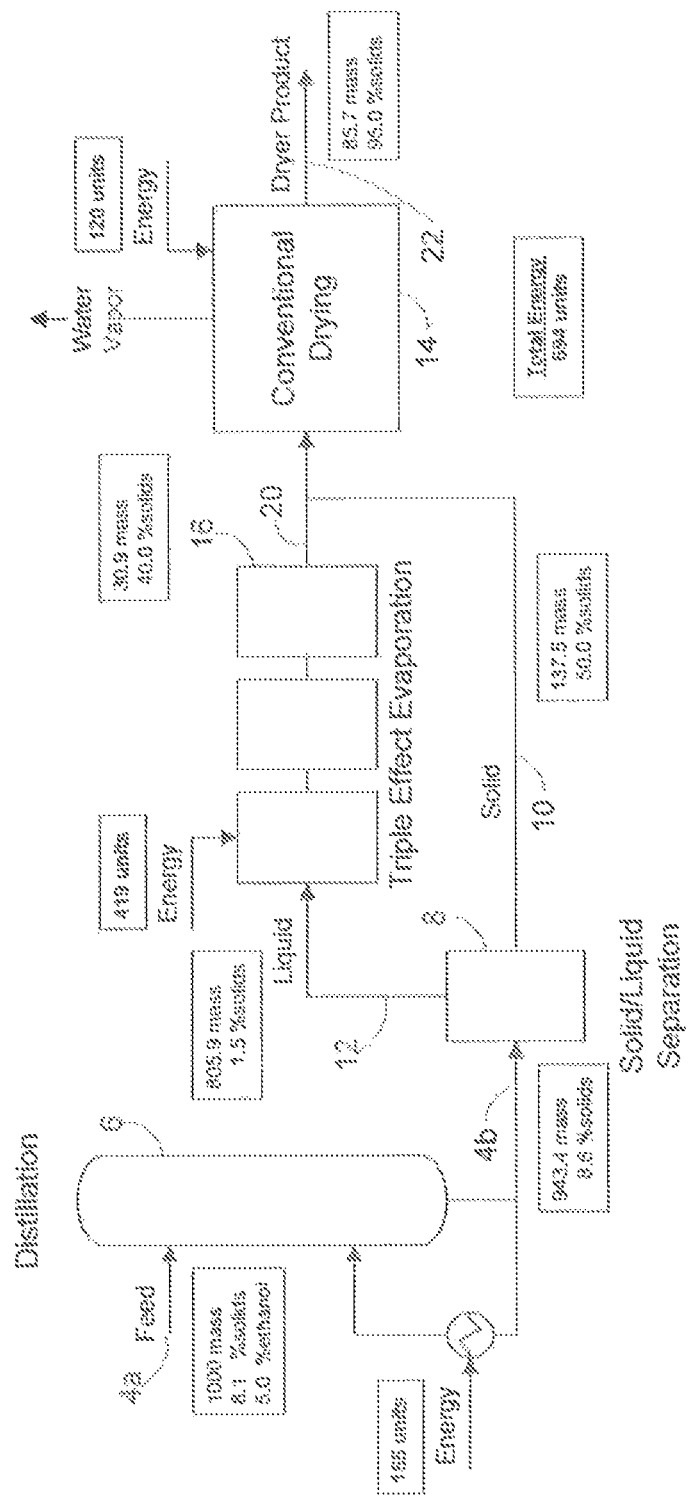
FIG. 1 shows a conventional solid/liquid component separation process for distillation whole stillage from lignocellulosic biomass.

FIG. 1 shows a conventional solid/liquid separation process 2. In the solid/liquid separation process 2, fermented lignocellulosic biomass 4a is fed into a distillation column 6 for processing. In the distillation column 6, alcohol (ethanol) is boiled off. The ethanol evaporates to the top of the distillation column 6 and the remaining biomass 4b falls to the bottom. The remaining biomass 4b is then fed out of the distillation column 6 to a solid/liquid separation device 8. In the solid/liquid separation device 8, the remaining biomass 4b is separated into a solids component 10 and a liquid component 12 including residual suspended solids and dissolved solids. The solid component 10 is fed to a conventional dryer 14. The liquid component 12 is fed to an evaporator 16.

The liquid component 12 is fed to the evaporator 16 to further separate solids from the liquid component 12. The liquid component 12 is condensed in the evaporator 16 to a concentrate 20.

The concentrate 20 and the solids component 10 are combined and introduced to the dryer 14 for further drying to drive off water to produce a dried product 22.

Figure 2:
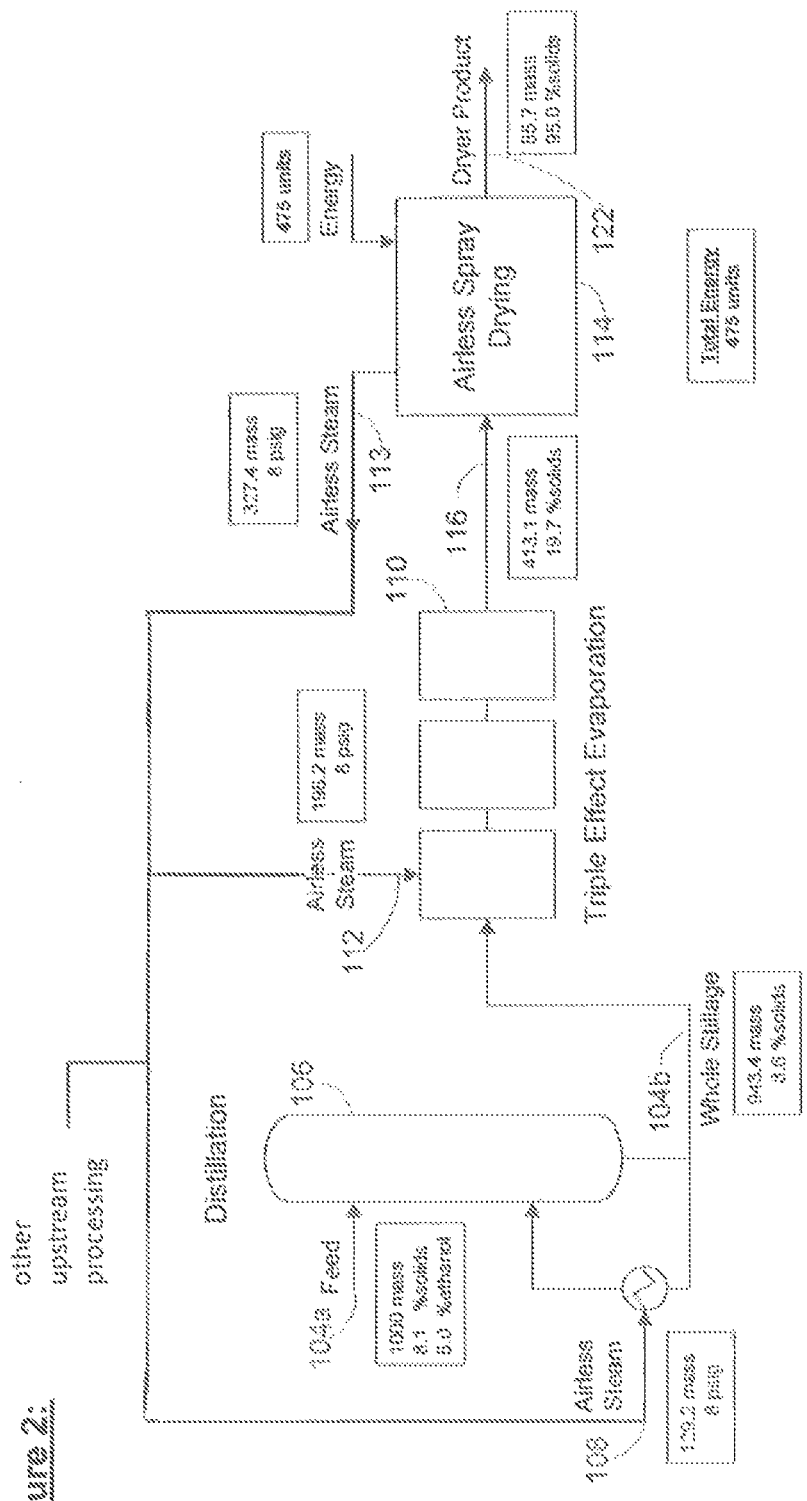
FIG. 2 shows a solid/liquid component separation process for distillation whole stillage from lignocellulosic biomass, employing airless spray drying technology in accordance with the present application.

FIG. 2 shows a solid/liquid separation process 102 in accordance with the present application. In this solid/liquid separation process 102, fermented lignocellulosic biomass 104a is fed into a distillation column 106 for processing. Airless steam 108 from the airless dryer is introduced to the distillation column 106 to boil off the alcohol (ethanol) in the fermented lignocellulosic biomass. The ethanol evaporates to the top of the distillation column 106 and a remaining biomass or distillation whole stillage 104b (whole stillage) falls to the bottom of the distillation column 106.

After processing in the distillation column 106, the whole stillage 104b is fed directly into an evaporator train 110 without any prior step of solid/liquid separation. The whole stillage generally includes a majority of liquid and a relatively low solids content, for example 8-6% solids.

Airless steam 112, which is steam superheated slightly above the saturation temperature and preferably was generated in the airless spray dryer (see below) is introduced into the evaporator 110. The airless steam preferably is at a pressure of 8 to 15 psig and a temperature of 235 to 250 F (112 C to 121 C). Preferably, the evaporator 110 is a triple effect falling film and forced circulation evaporator train, as known in the art. The concentrate 116 obtained after processing in the evaporator 110 is fed to an airless spray dryer 114 for further drying. Residence time in the airless spray dryer is usually very short, less than 1 minute total, while the "spray of fluid" takes only a few seconds of time to boil away the water in and around the small solid particles. The solids will be dried to 95 to 99% solids. Practically all the water is evaporated almost instantly. For example, on entering the airless spray dryer 114, the whole stillage has been concentrated to a concentrated product 116 including about 20% to 25% solids. After exiting the airless spray dryer, the dried product 122 is preferably about 95% to 99% solids. The spray dryer is preferably an SPX airless spray dryer with a rotating atomizing nozzle generating fine droplets in the range of 50 to 100 microns and operating at an airless steam temperature of from 105 C to 190 C.

Excess airless steam 113 is generated in the airless spray drying by evaporation of the liquid in the concentrated product 116, which excess airless steam is then cycled back to the evaporator 110 (see above), the distillation column 106, or other upstream processing steps which require the addition of steam. This results in a closed process and system which does not emit contaminated gases to the environment and creates a more energy efficient process, as the excess airless steam, and thus the water in the concentrate, is completely reused all with less equipment and lower capital costs compared to conventional systems. In other words, in the system and method of the invention, at least some, and most preferably all, of the water removed from the distillation whole stillage in the spray dryer is converted to airless steam, which can then be reused wherever steam is needed in the biofuel production process, the advantage being that now "new" water is needed for the steam addition upstream and no energy is wasted by exhausting steam and other gases, of whatever temperature, to the atmosphere. Once sufficient energy is supplied to the airless spray dryer to convert all of the evaporated water to airless steam, the "new" or "excess" steam generated can then be reused anywhere in the biofuel process where steam is needed.

Figure 3:
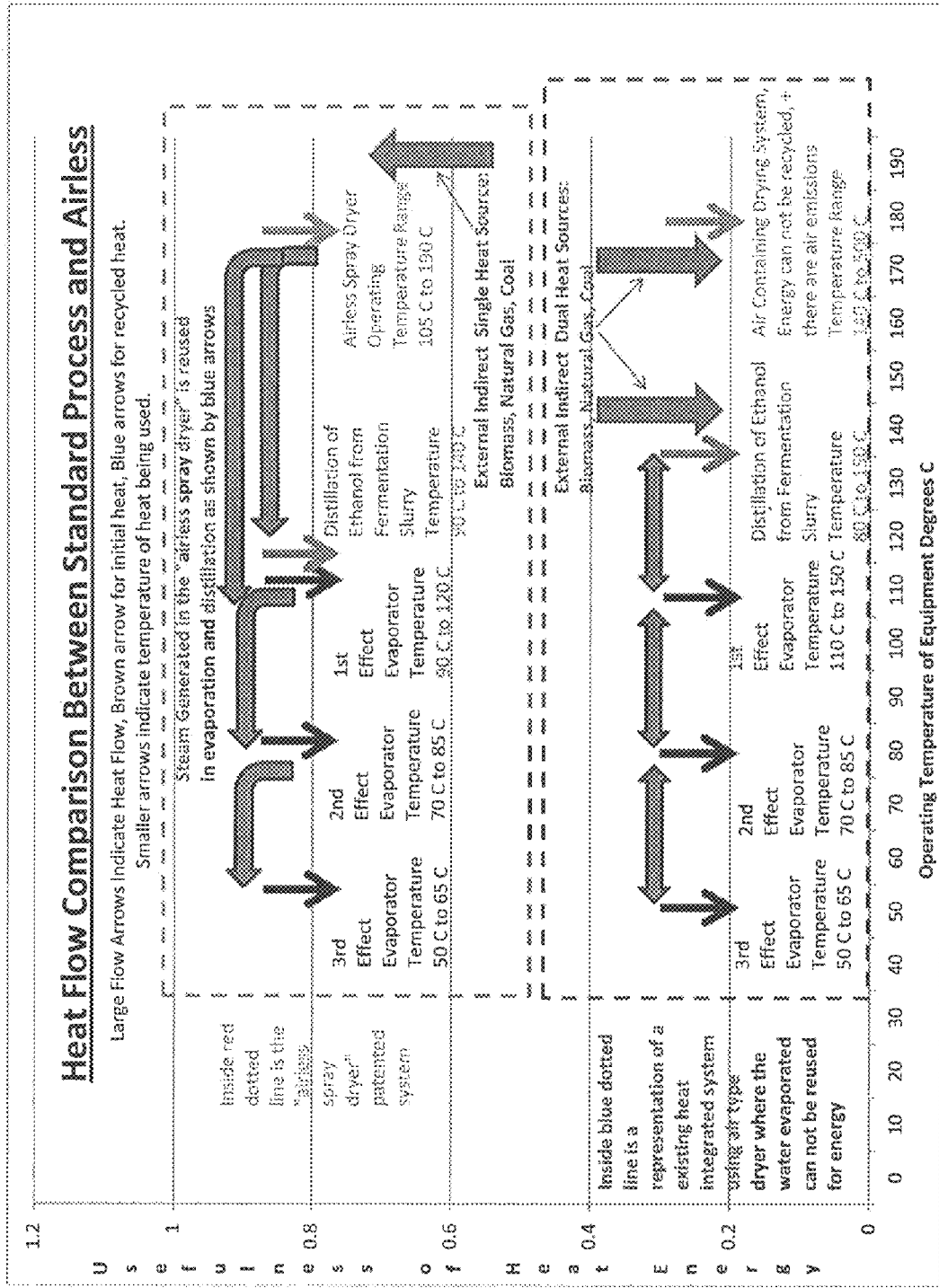
FIG. 3 illustrates the heat energy flow in a solid/liquid separation process in accordance with the invention and including an airless spray drying step in comparison with a conventional process including a standard drying step.

The heat energy flow in a solid/liquid separation process in accordance with the invention and including an airless spray drying step is illustrated graphically in FIG. 3 in comparison with a conventional process including a standard drying step. As is apparent, dual external heat sources are required in the conventional process for the distillation and drying steps, whereas only a single external heat source for the airless spray drying step is required in the process in accordance with the invention, since the heat energy added in the airless spray drying step can be fully redirected to upstream processes. Moreover, all gases produced in the airless spray drying step are re-directed to upstream processes, avoiding the emissions and associated heat energy loss, associated with the conventional process.

The above-described embodiments are intended to be examples only. Alterations, modifications and variations can be effected to the particular embodiments by those of skill in the art without departing from the scope, which is defined solely by the claims appended hereto.

What is claimed is:

1. A process for separating solid and liquid components in a distillation whole stillage resulting from distillation of fermented lignocellulosic biomass, comprising the steps of:
    a) subjecting the whole stillage in an evaporation step to airless steam for separating the whole stillage into a condensate and a concentrate, the concentrate including water, dissolved solids and suspended solids;
    b) subjecting the concentrate to a step of airless steam spray drying for converting the concentrate into dried solids, excess airless steam and vapours; and
    c) redirecting all excess airless steam and vapours resulting from the airless steam spray drying step as an energy source to step a) and to another processing step upstream of the airless spray drying step.

2. The process of claim 1, wherein the other upstream processing step is a distillation step.

3. The process of claim 1, wherein the evaporation step is a multiple effect evaporation step whereby the whole stillage is partially concentrated in a first effect evaporator step using the excess airless steam, the whole stillage is further concentrated in a second effect evaporator step using evaporation vapor energy from the first effect evaporator step, and the whole stillage is further concentrated in a third effect evaporator step using evaporation vapor energy from the second effect evaporation step.

4. The process of claim 1, wherein the distillation whole stillage contains between 8 and 10% solids.

5. The process of claim 1, wherein the concentrate contains about 20% to 25% solids.

6. The process of claim 5, wherein the concentrate contains about 20% solids.

7. The process of claim 1, wherein the dried product contains about 95% to 99% solids.

8. The process of claim 7, wherein the dried product contains about 95% solids.

9. The process of claim 1, wherein the airless steam spray drying step is carried out at an airless steam input temperature for ensuring the steam generated in the airless spray drying step is excess airless steam.

10. A solid/liquid separation system for separating a distillation whole stillage resulting from distillation of fermented lignocellulosic biomass into solid and vapor components, comprising
    a) an evaporator for subjecting the whole stillage to airless steam for separating the whole stillage into a condensate and a concentrate, the concentrate including water, dissolved solids and suspended solids;
    b) an airless steam spray drier for converting the concentrate into dried solids, excess airless steam and vapours; the spray drier connected to the evaporator for receiving the concentrate; and
    c) piping for cycling all of the excess airless steam and vapours generated in the airless steam spray drier in a closed loop to the evaporator and another upstream processing unit.

11. The solid/liquid separation system of claim 10, wherein the other upstream processing unit is a distillation column for the distillation of the fermented lignocellulosic biomass.

12. The solid/liquid separation system of claim 10, wherein the concentrate includes about 20% to 25% solids.

13. The solid/liquid separation system of claim 12, wherein the concentrate includes about 20% solids.

14. The solid/liquid separation system of claim 10, wherein the airless steam dryer includes an indirect heater for heating the airless steam used in the airless steam drier has to at least a temperature of 105 C to 190 C for converting all of the water in the concentrate into excess airless steam.

* * * * *